(12) United States Patent
Buissette et al.

(10) Patent No.: US 11,286,422 B2
(45) Date of Patent: Mar. 29, 2022

(54) SUSPENSION OF A MAGNESIUM SILICATE, METHOD FOR MAKING SAME AND USE THEREOF AS A PHOSPHOR

(71) Applicant: RHODIA OPERATIONS, Paris (FR)

(72) Inventors: Valérie Buissette, Paris (FR); Franck Aurissergues, Argenteuil (FR); Thierry Le-Mercier, Rosny-sous-Bois (FR)

(73) Assignee: RHODIA OPERATIONS, Paris (FR)

( * ) Notice: Subject to any disclaimer, the term of this patent is extended or adjusted under 35 U.S.C. 154(b) by 327 days.

(21) Appl. No.: 15/321,282

(22) PCT Filed: Jun. 30, 2015

(86) PCT No.: PCT/EP2015/064838
§ 371 (c)(1),
(2) Date: Dec. 22, 2016

(87) PCT Pub. No.: WO2016/001219
PCT Pub. Date: Jan. 7, 2016

(65) Prior Publication Data
US 2017/0158956 A1    Jun. 8, 2017

(30) Foreign Application Priority Data
Jun. 30, 2014 (EP) .................................. 14306053

(51) Int. Cl.
| | | |
|---|---|---|
| *C09K 11/77* | (2006.01) | |
| *C09K 11/02* | (2006.01) | |
| *C01B 33/22* | (2006.01) | |
| *C09D 5/22* | (2006.01) | |
| *C09K 11/59* | (2006.01) | |
| *C09D 11/03* | (2014.01) | |
| *C09D 11/32* | (2014.01) | |
| *C09D 11/50* | (2014.01) | |

(52) U.S. Cl.
CPC .......... *C09K 11/7734* (2013.01); *C01B 33/22* (2013.01); *C09D 5/22* (2013.01); *C09D 11/03* (2013.01); *C09D 11/32* (2013.01); *C09D 11/50* (2013.01); *C09K 11/025* (2013.01); *C09K 11/592* (2013.01)

(58) Field of Classification Search
CPC . C09K 11/02; C09K 11/7734; C09K 11/7774; C09K 11/025; C09D 11/03; C09D 11/32; C09D 11/50; C09D 5/22; H01J 2211/42; H01J 9/223; C04B 35/62897; C01B 33/22
USPC .............. 252/301.4 R, 301.36; 313/486, 582
See application file for complete search history.

(56) References Cited

U.S. PATENT DOCUMENTS

| | | | |
|---|---|---|---|
| 2004/0017154 A1* | 1/2004 | Ito .......................... | C09K 11/595 313/582 |
| 2004/0080271 A1* | 4/2004 | Aoki ................... | C09K 11/7734 313/582 |
| 2007/0057618 A1 | 3/2007 | Otsuka et al. | |
| 2007/0295116 A1* | 12/2007 | Le Mercier .......... | G07D 7/1205 73/866 |
| 2008/0135862 A1* | 6/2008 | Maeda ................... | H01L 33/502 257/98 |
| 2011/0038947 A1* | 2/2011 | Maurer ................ | C09K 11/664 424/600 |

FOREIGN PATENT DOCUMENTS

| | | |
|---|---|---|
| EP | 1353354 A1 | 10/2003 |
| EP | 1589557 A1 | 10/2005 |
| FR | 2869159 A1 | 10/2005 |
| JP | 2001-303045 A | 10/2001 |
| JP | 2002-226842 A | 8/2002 |
| JP | 2002226842 A * | 8/2002 |
| JP | 2003206480 A | 7/2003 |
| JP | 2004-075889 A | 3/2004 |
| WO | 07/020798 A | 2/2007 |

OTHER PUBLICATIONS

Machine translation of JP-2002226842-A, 24 pages. (Year: 2002).*

* cited by examiner

Primary Examiner — Matthew E. Hoban
Assistant Examiner — Lynne Edmondson
(74) Attorney, Agent, or Firm — Osha Bergman Watanabe & Burton LLP

(57) ABSTRACT

The silicate of magnesium and of barium, strontium or calcium of the invention is characterized in that it is in the form of a suspension of solid crystallized particles in a liquid phase, said particles having a mean size between 0.1 µm and 1 µm. It is prepared by spray-drying a liquid mixture comprising compounds of magnesium, of silicium and of at least one first element chosen from barium, strontium and calcium, by submitting the dried mixture to a first calcination in air and to a second calcination in a reducing atmosphere and by wet milling the calcined mixture.

14 Claims, 1 Drawing Sheet

SUSPENSION OF A MAGNESIUM SILICATE, METHOD FOR MAKING SAME AND USE THEREOF AS A PHOSPHOR

CROSS-REFERENCE TO RELATED APPLICATIONS

The present application is a U.S. national phase entry under 35 U.S.C. § 371 of International Application No. PCT/EP2015/064838, filed on 30 Jun. 2015, which claims priority to European application No. 14306053.1, filed on Jun. 30, 2014. The entire content of each of these applications is hereby incorporated herein by reference for all purposes.

The present invention relates to a suspension of a magnesium silicate, a method for producing it and to the use of the silicate as a phosphor.

This application claims priority to European application No. 14306053.1, filed on Jun. 30, 2014, the whole content of this application being incorporated herein by reference for all purposes.

FIELD OF THE INVENTION AND TECHNICAL PROBLEM

The luminescence and electronics fields are currently experiencing considerable developments. Examples of these developments that may be mentioned include the development of plasma systems (displays and lamps) for new techniques in displays, lighting or marking. These new applications require phosphor materials having further improved properties. Thus, apart from their luminescence property, specific particle size characteristics are required of these materials so as in particular to facilitate their implementation in the required applications.

More precisely, there is a demand to have phosphors in the form of particles that have a very small, submicronic, size, especially smaller than 500 nm and in the form of suspension, such a suspension being very convenient for the preparation of material in the form of thin, transparent and luminescent films.

The main object of the invention is to provide products having such particle size characteristics. For this purpose the silicate of the invention is a silicate of magnesium and of at least one first element chosen from barium, strontium and calcium, and it is characterized in that it is in the form of a suspension of solid crystallized particles in a liquid phase, said particles having a mean size between 0.1 μm and 1.0 μm.

Figure 1:
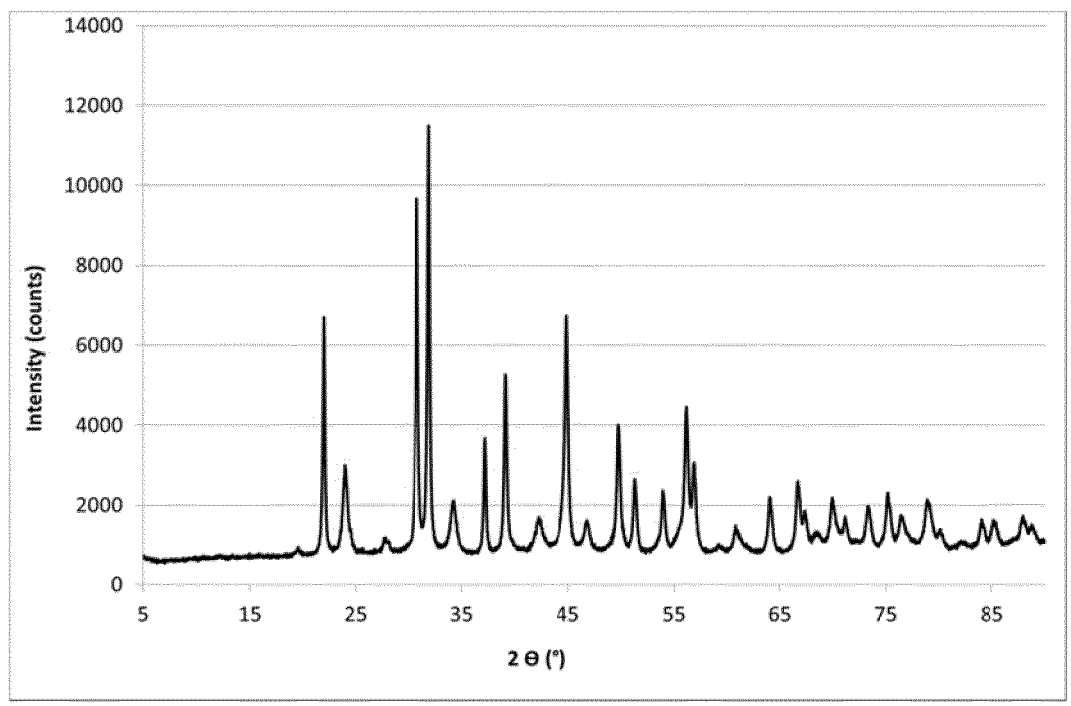
Figure 2:
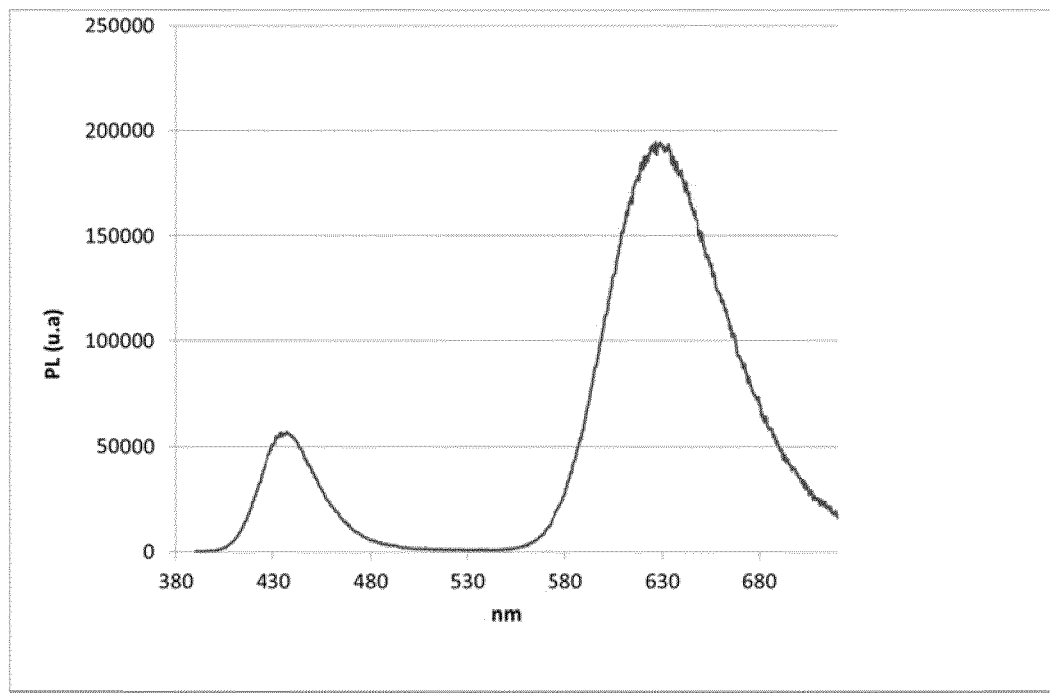

Other features, details and advantages of the invention will become even more fully apparent on reading the following description, in conjunction with the appended drawings in which:

FIG. 1/2 is an XRD pattern (intensity vs. 2-theta angle in °) of a silicate according to the invention;

FIG. 2/2 is an emission spectrum (photoluminescence PL vs. wavelength in nm) of this same silicate.

PRIOR ART

JP 2003-206480 and the equivalent applications US 2004/0080271 or EP 1353354 disclose a plasma display device with spherical particles of blue-emitting phosphor with an average particle diameter ranging from 0.1 to 3.0 μm. It is not disclosed what type of average value is given. There is no disclosure of a suspension in an organic solvent nor of a stable suspension as claimed. The process involves spraying into a furnace heated at a temperature from 1000 to 1500° C. The temperature used in the process of JP 2003-206480 is much higher than the temperature used in the $2^{nd}$ step of the process of the present invention.

EP 1589557 discloses particles of phosphor of a different chemical nature.

FR 2869159 discloses a LED emitting in the white with a $1^{st}$ phosphor emitting in the blue and in the red and a $2^{nd}$ phosphor emitting in the green. The $2^{nd}$ phosphor can be a $MSi_2O_5$:Eu or $MSiO_4$:Eu (M=Ba or Sr). There is no reference of a suspension as claimed.

US 2007/0057618 discloses a silicate of formula $(Me_{1-y}Eu_y)_2SiO_4$ (Me=Ba, Sr, Ca or Mg). The phosphor as a grain size (distribution in volume) of from about 10 to 50 μm, so of a different size than the silicate according to the invention.

Definitions

The term "rare earth" is understood in the present description to mean elements of the group formed by yttrium and the elements of the Periodic Table with atomic numbers between 57 and 71 inclusive.

The mean size and other characteristics of the distribution of size of the particles are obtained by implementing the laser diffraction technique using a laser particle size analyzer. The distribution is given in volume. It can be obtained with a Malvern Mastersizer.

It is specified here that the measurements are performed on suspensions that have not suffered any settling, that is to say with no supernatant and no settled phase, and which, if necessary, have been treated ultrasonically using well-known methods for measurements of this type. The measurements of the mean size and other characteristics of the distribution are given for particles which may consist of agglomerates of at least two or more primary particles. In some embodiments the primary particles are not agglomerated and thus the mean size of particles which is measured by the laser diffraction technique correspond to the mean size of the primary particles.

The distribution index is the value obtained also by implementing the laser scattering technique using a laser particle size analyzer (volume distribution). The term "distribution index" is understood to mean the ratio:

$$\sigma/m = (d_{84} - d_{16})/2d_{50}$$

in which:
- $d_{84}$ is the diameter of the particles for which 84% of the particles have a diameter of less than $d_{84}$;
- $d_{16}$ is the diameter of the particles for which 16% of the particles have a diameter of less than $d_{16}$; and
- $d_{50}$ is the mean diameter of the particles.

DESCRIPTION OF THE INVENTION

The silicate of the invention is in the form of a suspension of particles in a liquid phase. The liquid phase of the suspension is generally an organic solvent, more particularly a polar solvent. As suitable solvents, mention may be made of alcohols such as methanol, propanol or ethanol, glycols such as ethylene glycol, acetate derivatives of glycols such as ethylene glycol monoacetate, glycol ethers, polyols or ketones. The organic solvent can also be a mixture of two or more compatible organic solvents forming a unique phase at 25° C.

The liquid phase may be also a mixture of an organic solvent, such as mentioned here above, and water, preferably with less than 50% of volume of water. In the case of a mixture of an organic solvent and water, the amount of water is such that the organic solvent and water form a unique phase at 25° C. and such that the silicate does not dissolve or lose its elements (A, Mg, Si, Eu, Mn, . . . ) in the liquid phase at 25° C. over a period of 24 hrs.

The liquid phase is preferably an organic solvent with less than 1% by weight of water (1 part of water and 99 parts of organic solvent).

This liquid phase may also comprise a dispersant. This dispersant may be chosen from known dispersants, for example from alkali-metal polyphosphates ($M_{n+2}P_nO_{3n+1}$) or metaphosphates ($[MPP_3]_n$) (M denoting an alkali metal such as sodium), especially such as sodium hexametaphosphate. It may also be chosen from alkali-metal silicates (sodium silicate), aminoalcohols, phosphonates, citric acid and its salts, derivatives of phosphosuccinic acid (($HOOC)_n$—R—$PO_3H_2$ where R is an alkyl residue), polyacrylic, polymethacrylic and polystyrene sulfonic acids and salts thereof. The amount of dispersant may be between 0.1% and 10%, more particularly between 0.5% and 5.0% and still more particularly 1.0% and 3.0%, this amount being expressed by weight of dispersant relative to the weight of solid in the suspension.

The concentration of the suspension may vary over a wide range. To give an example, it may be between about 10 g/l and about 500 g/l, more particularly between 100 g/l and 300 g/l, this concentration being expressed by weight of solid per volume of suspension.

The silicate of the invention is based on magnesium and on at least one first element chosen from barium, strontium and calcium. The aforementioned first element is preferably barium.

The silicate may contain at least one additional second element, called "substituent" or "dopant". Indeed this second element is considered as partially substituting at least one of the constituent elements, that is the aforementioned first element and/or magnesium, and make it possible in particular to modify the optical and luminescent properties of the silicate. Given below are examples of such substituents for each constituent element on the basis of what is commonly accepted at the present time in the prior art. This implies that it would not be outside the scope of the present invention if a substituent described for a given constituent element were in fact to prove subsequently to substitute for a constituent element other than that presumed in the present description.

Thus, the aforementioned first element may be partially substituted with at least one rare earth that may especially be gadolinium, terbium, yttrium, ytterbium, europium, neodymium and dysprosium, these elements possibly being taken individually or in combination. Europium is a preferred dopant/substituent.

Likewise, magnesium may be partially substituted with at least one element chosen from zinc, manganese and cobalt. Manganese is a preferred dopant/substituent.

According to a preferred embodiment of the invention the silicate is doped with at least one second element chosen from europium and manganese and, still more preferably with both europium and manganese.

As is known, the amounts of these substituents may vary widely, however they must be such that, as regards the maximum values, the crystallographic structure of the silicate is substantially preserved. Moreover, the minimum amount of substituent is that below which the substituent produces no effect.

Generally the total amount of substituent is at most 30%, more particularly at most 20% and still more particularly at most 10%, this amount being expressed in at % (substituent/(first element+magnesium) atomic ratio).

The amount of substituent is generally at least 1 at %, more preferably at least 2 at %. More particularly, the amount of substituent for the first element is at most 40%, more particularly at most 20% and even more particularly at most 10%, this amount being expressed in at % (substituent/(substituent+first element) atomic ratio). For magnesium, this amount (expressed in at %) is generally at most 60%, more particularly at most 40% and even more particularly at most 10%.

With formula $Ba_{3-x}Mg_{1-y}Si_2O_8$, the total amount of substitution is $(x+y)/4$. The total amount of substitution is therefore $(x_{min}+y_{min})/4$ and at most $(x_{max}+y_{max})/4$ wherein $x_{min}$ and $x_{max}$ are respectively the minimum and maximum values given respectively for x and y in each range disclosed in the present application.

According to specific embodiments of the invention, the silicate of the invention satisfies one of the following formulas:

$AMgSiO_4$

$AMgSiO_4:Eu^{2+}$

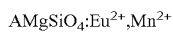

$AMgSiO_4:Eu^{2+},Mn^{2+}$

$A_3MgSi_2O_8$

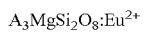

$A_3MgSi_2O_8:Eu^{2+}$

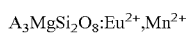

$A_3MgSi_2O_8:Eu^{2+},Mn^{2+}$

$A_2MgSi_2O_7$

$A_2MgSi_2O_7:Eu^{2+}$

$A_2MgSi_2O_7:Eu^{2+},Mn^{2+}$, in which A is at least one element chosen from barium, strontium and calcium. A preferred element A is Ba.

According to another specific embodiment of the invention, the silicate satisfies the following formula:

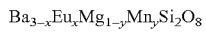

$Ba_{3-x}Eu_xMg_{1-y}Mn_ySi_2O_8$ x and y satisfying the following relationships: $0<x\leq1$; $0<y\leq0.3$ and $x+y\leq1,2$.

According to an embodiment, the silicate contains both Eu and Mn.

More particularly, x and y satisfy the following relationships:

$0.0001\leq x\leq0.25$ and $0.0001\leq y\leq0.25$; or $0.01\leq x\leq0.25$ and $0.01\leq y\leq0.25$.

According to an embodiment, x and y satisfy the following relationships:

$0.01\leq x\leq0.15$ and $0.04\leq y\leq0.15$

The silicate can be one disclosed in the examples. According to an embodiment, $0.99\leq x\leq0.11$ and $0.99\leq y\leq0.11$. According to another embodiment, $0.018\leq x\leq0.022$ and $0.045\leq y\leq0.055$.

The main feature of the invention is that the suspension comprises particles of silicate which are submicronic particles. More precisely, the particles in suspension have a mean size ($d_{50}$) which is comprised between 0.1 µm and 1.0 µm. More particularly, the mean size ($d_{50}$) is comprised between 0.1 µm and 0.5 µm.

The particles of silicate of the invention contain one or more crystallites with a crystallite size between 45 nm and 200 nm and more particularly between 50 nm and 150 nm. It is be pointed out here that the crystallite size is obtained from X-ray diffraction (XRD) analysis and it corresponds to the size of the coherent domain calculated from the most intense diffraction peak, for instance for the silicate of formula $Ba_3MgSi_2O_8$, the peak corresponding to the [110] crystallographic plane.

The particles may have a narrow particle size distribution, more precisely their distribution index ($\sigma/m$) may be at most 1.30, particularly at most 1.00, more particularly at most 0.75 and even more particularly at most 0.50.

As regards the solid particles, they consist essentially or only of the silicate as described, they do not contain compounds other than this silicate, with the exception, for example, of possible impurities in a very small amount, typically of less than 1% by weight (that is 1 part of impurity/ies per 99 parts of silicate).

The suspension of the invention is stable, which is understood to mean that no sedimentation of the solid particles is observed over several hours, for example over a period of about 24 hours. However, some sedimentation may be observed over the course of time after 24 hours, which may result in the particles agglomerating. However, and this is an important property of the suspension of the invention, simple agitation using very low mechanical energy, especially an ultrasonic treatment, for example with a power of 120 W for three minutes, serves to deagglomerate these particles and therefore to recover the suspension, the particles of which have all the above mentioned characteristics.

The suspension is thus such that:
there is no sedimentation of the particles over a period of 24 hours; and
if sedimentation is observed after the period of 24 hours, an agitation using an ultrasonic treatment with a power of 120 W for three minutes makes it possible to deagglomerate the particles.

Another object of the present invention is also a composition comprising a liquid phase and solid crystallized particles of a silicate of magnesium and of at least one first element chosen from barium, strontium and calcium, said particles having a mean size between 0.1 µm and 1.0 µm. All definitions and preferences indicated above for the silicate of the invention, the suspension and the liquid phase equally apply to the composition of the invention.

The process for producing the silicate of the invention in suspension form or the composition will now be described. This process is characterized in that it comprises the following steps:
a liquid mixture comprising compounds of magnesium, of silicium, of at least one first element chosen from barium, strontium and calcium and, possibly, of one second element, is formed;
said mixture is spray-dried;
the dried product is submitted to a first calcination in air and to a second calcination in a reducing atmosphere;
a wet milling operation is carried out on the product after the calcinations.

The with the spray-drying step process according to the invention makes it possible to obtain a good homogeneization of the elements that form part of the silicate and to respect the stoichiometry.

One person skilled in the art can use the recipes and details disclosed in the examples to prepare a suspension as claimed.

$1^{st}$ Step

This process includes a first step in which a liquid mixture is formed, this being a solution or a suspension of the compounds of the magnesium and of the first abovementioned element in the composition of the silicate. This mixture may contain also a compound of at least one of the second element if the silicate which is prepared contains at least one of such second substituent element.

As compounds of these elements, it is common practice to use inorganic salts or hydroxides or carbonates. As salts, preferably nitrates may be mentioned, especially in the case of barium, europium and magnesium. Sulfates, chlorides or else organic salts, for example acetates, may optionally be employed.

For silicium a sol or suspension of silica is used preferably and, still more preferably, a sol or suspension of fumed, pyrogenic silica. Fumed silica is preferable. Such a sol may have particles or colloids which present a nanometric size.

$2^{nd}$ Step

The next step consists in drying the mixture prepared beforehand. This drying is performed by spray-drying. The expression "spray drying" is understood to mean drying by spraying the mixture into a hot atmosphere. The spraying may be performed by means of any sprayer known per se, for example a spray nozzle of the sprinkler-rose type or another type. It is also possible to use atomizers called turbine atomizers. With regard to the various spraying techniques that can be used in the present method, reference may especially be made to the fundamental work by Masters entitled "*Spray drying*" (second edition, 1976, published by George Godwin, London).

It should be noted that it is also possible to employ the spray-drying operation by means of a "flash" reactor, for example of the type described in French Patent Applications Nos 2 257 326, 2 419 754 and 2 431 321.

The spray-drying is generally carried out with a solid output temperature of between 100° C. and 300° C. The temperature in this step is lower than 400° C.

$3^{rd}$ Step

The next step of the process consists in calcining the product obtained after the drying operation. The calcination is carried out in two steps. Thus a first calcination is carried out in air at a temperature which is high enough to obtain a crystalline phase. In general, this temperature is at least 900° C. and it may be comprised between 900° C. and 1200° C. The duration of this calcination is for example between about 30 minutes and 10 hours.

The second calcination is carried out in a reducing atmosphere, for example in a hydrogen/nitrogen or hydrogen/argon mixture. The temperature of this second calcination is generally comprised between 1000° C. and 1400° C. The duration of this calcination is for example between about 30 minutes and 10 hours.

$4^{th}$ Step

The $4^{th}$ and final step of the process consists in milling the product obtained from the calcination. According to the invention, the product undergoes wet milling in an organic solvent of the same type as the solvents described above as regards the constituent liquid phase of the suspension.

During the milling, a dispersant of the type of those described above, and in the amounts given above, may be used.

The wet milling is carried out under conditions that moreover are well known to those skilled in the art. Wet ball milling may be used preferably. After the wet milling, the silicate of the invention in suspension form is obtained.

Use of the Suspension

Owing to their properties and the nature of the substituents or dopants, the silicate of the invention may be used as phosphor. More precisely, this silicate has luminescence properties under electromagnetic excitation in the range of wavelengths used in plasma systems (displays and lamps, in which the excitation is created by a rare gas or a mixture of rare gases, such as xenon or/and neon), in mercury vapor lamps and in light-emitting diodes (LEDs). Thus, it may be used as phosphor in plasma systems (display or illumination system), in mercury vapor lamps and in LEDs.

The invention also relates to luminescent devices comprising the silicate or the composition described above or as obtained by the process described above or luminescent devices manufactured using this same silicate or composition. These devices relates to plasma systems, mercury vapor lamps or LEDs in the manufacture of which the silicate may be used as a phosphor, or comprising this same silicate. The processing of the phosphors in the manufacture of these products employs well-known techniques, for example screen printing, electrophoresis, sedimentation, inkjet printing, spraying, spin coating or dip coating.

Should the disclosure of any patents, patent applications, and publications which are incorporated herein by reference conflict with the description of the present application to the extent that it may render a term unclear, the present description shall take precedence. The invention will be now described in more detail with reference to the following examples, whose purpose is merely illustrative.

EXAMPLES

Example 1 this example relates to the preparation of suspension in ethanol of barium magnesium europium manganese silicate according to the invention of formula $Ba_{2.7}Eu_{0.3}Mg_{0.9}Mn_{0.1}Si_2O_8$.

A solution was made up from a mixture of barium, magnesium, europium and manganese nitrates with the following composition (in at %):

Ba: 67.5%
Mg: 22.5%
Eu: 7.5%
Mn: 2.5%

Water was added to this nitrate mixture to reach a final cationic concentration of 0.27 mol/l. A fumed silica (50 m²/g) suspension was also prepared with a Si concentration of 0.7 mole/l. The nitrate solution and the suspension of fumed silica were mixed to obtain a global suspension with the following molar ratio:

Ba/Si: 1.35
Mg/Si: 0.45
Eu/Si: 0.15
Mn/Si: 0.05

The final pH is 4.4. The suspension was dried in a flash spray dryer with and input temperature of 350° C. and an output temperature of 140° C. The dried product was calcined a 1200° C. for 6 hours under air and then at 1200° C. for 6 hours under $Ar/H_2$ (95/5) atmosphere.

The powder obtained was subjected to a wet milling operation in a Netzch ball mill with $ZrO_2$—$Y_2O_3$ balls of 0.4-0.6 mm diameter. The balls occupied 50% of the milling container. The solid was dispersed in absolute ethanol and represent 28% by weight of the total suspension. The ball mill was equipped with a stirrer with a rotation speed of 1500 rpm. The milling time is 150 min.

Laser particle size analysis with ultrasounds (1 min15 s 80 W) of the suspension gave the following results:

| d10 (µm) | d16 (µm) | d50 (µm) | d84 (µm) | d90 (µm) | σ/m |
|---|---|---|---|---|---|
| 0.14 | 0.15 | 0.21 | 0.32 | 0.36 | 0.40 |

As is apparent from FIG. 1, an X ray diffraction analysis of the sample obtained by drying the suspension à 50° C. in an oven shows a $Ba_3MgSi_2O_8$ phase with a coherent domain size calculated from the diffraction line corresponding to the [110] crystallographic plane of 47 nm.

The suspension obtained emitted in the blue (438 nm) and in the red (620 nm) under excitation at 370 nm. FIG. 2 is the emission spectrum of this suspension.

Example 2 this example relates to the preparation of suspension in ethanol of a silicate according to the invention of the same formula as in example 1.

A powder was prepared and calcined in the same way as in example 1. This powder was subjected to a wet milling under the same conditions as in example 1. The milling time is 60 min.

Laser particle size analysis with ultrasound (1 min15 s 80 W) of the suspension obtained gave the following results:

| d10 (µm) | d16 (µm) | d50 (µm) | d84 (µm) | d90 (µm) | σ/m |
|---|---|---|---|---|---|
| 0.16 | 0.18 | 0.29 | 0.62 | 0.77 | 0.75 |

An X ray diffraction analysis of the sample obtained by drying the suspension à 50° C. in an oven shows a $Ba_3MgSi_2O_8$ phase with a coherent domain size calculated from the diffraction line corresponding to the [110] crystallographic plane of 75 nm.

The suspension obtained emitted in the blue (438 nm) and in the red (620 nm) under excitation at 370 nm.

Example 3 the product of example 3 has been prepared by the same route as the one described in example 1 until the wet milling step. The obtained powder was subjected to a wet milling under the same conditions as in example 1. The milling time is 45 min.

Laser particle size analysis without ultrasound of the suspension obtained gave the following results:

| d10 (µm) | d16 (µm) | d50 (µm) | d84 (µm) | d90 (µm) | σ/m |
|---|---|---|---|---|---|
| 0.18 | 0.20 | 0.43 | 1.05 | 1.29 | 0.98 |

An X ray diffraction analysis of the sample obtained by drying the suspension à 50° C. in an oven shows a $Ba_3MgSi_2O_8$ phase with a coherent domain size calculated from the diffraction line corresponding to the [110] crystallographic plane of 90 nm.

The suspension obtained emitted in the blue (438 nm) and in the red (620 nm) under excitation at 370 nm.

Example 4 this example relates to the preparation of suspension in ethanol of barium magnesium europium manganese silicate according to the invention of formula $Ba_{2.94}Eu_{0.06}Mg_{0.95}Mn_{0.05}Si_2O_8$.

A solution was made up from a mixture of barium, magnesium, europium and manganese nitrates with the following composition (in at %):
Ba: 73.5%
Mg: 23.75%
Eu: 1.5%
Mn: 1.25%

Water was added to this nitrate mixture to reach a final cationic concentration of 0.27 mol/l. A fumed silica (50 m$^2$/g) suspension was also prepared with a Si concentration of about 0.7 mole/l. The nitrate solution and the fumed silica solution were mixed to obtain a global suspension with the following molar ratio:
Ba/Si: 1.47
Mg/Si: 0.475
Eu/Si: 0.03
Mn/Si: 0.025

The final pH is 4.4. The said suspension was dried in a flash spray dryer with and input temperature of 350° C. and an output temperature of 140° C. The dried product was calcined a 1200° C. for 6 hours under air and then 1200° C. for 6 hours under Ar/H$_2$ (95/5) atmosphere.

The powder obtained was subjected to a wet milling operation under the same conditions as in example 1. The milling time is 25 min.

Laser particle size analysis with ultrasounds (1 min15 s 80 W) of the suspension obtained gave the following results:

| d10 (µm) | d16 (µm) | d50 (µm) | d84 (µm) | d90 (µm) | σ/m |
|---|---|---|---|---|---|
| 0.17 | 0.19 | 0.49 | 1.43 | 1.75 | 1.26 |

An X ray diffraction analysis of the sample obtained by drying the suspension à 50° C. in an oven shows a $Ba_3MgSi_2O_8$ phase with a coherent domain size calculated from the diffraction line corresponding to the [110] crystallographic plane of 130 nm.

The suspension obtained emitted in the blue (438 nm) and in the red (620 nm) under excitation at 370 nm.

TABLE I

| Ex. | silicate | d50 (µm) | σ/m | domain size (nm) |
|---|---|---|---|---|
| 1 | $Ba_{2.7}Eu_{0.3}Mg_{0.9}Mn_{0.1}Si_2O_8$ | 0.21 | 0.40 | 47 |
| 2 | $Ba_{2.7}Eu_{0.3}Mg_{0.9}Mn_{0.1}Si_2O_8$ | 0.29 | 0.75 | 75 |
| 3 | $Ba_{2.7}Eu_{0.3}Mg_{0.9}Mn_{0.1}Si_2O_8$ | 0.43 | 0.98 | 90 |
| 4 | $Ba_{2.94}Eu_{0.06}Mg_{0.95}Mn_{0.05}Si_2O_8$ | 0.49 | 1.26 | 130 |

The domain size depends largely on the wet milling step (as is visible in Table I, the domain size is dependent on the size of the crystallites. Preferably, the crystallite size is at least 75 nm.

The invention claimed is:

1. A process for producing a silicate, wherein the process comprises:
   spray-drying a liquid mixture comprising compounds of magnesium, of silicium, of at least one first element chosen from barium, strontium and calcium, and, optionally, of one second element;
   calcining the spray-dried product in air followed by calcining in a reducing atmosphere;
   wet milling the calcined product;
   and wherein the silicate is comprised of magnesium and of at least one first element chosen from barium, strontium and calcium, which satisfies one of the following formulas:

$AMgSiO_4$ $AMgSiO_4:Eu^{2+}$ $AMgSiO_4:Eu^{2+},Mn^{2+}$ $A_3MgSi_2O_8$ $A_3MgSi_2O_8:Eu^{2+}$ $A_3MgSi_2O_8:Eu^{2+},Mn^{2+}$ $A_2MgSi_2O_7$ $A_2MgSi_2O_7:Eu^{2+}$ $A_2MgSi_2O_7:Eu^{2+},Mn^{2+}$, in which A is at least one element selected from the group consisting of barium, strontium and calcium,
   wherein the silicate is in the form of a suspension of solid crystallized particles in an organic solvent, said particles having a mean size (d50) between 0.1 µm and 1.0 µm, said mean size (d50) being determined from the volume distribution of particles measured using a laser diffraction technique with a laser particle size analyzer, and wherein said particles contain crystallites with a crystallite size between 45 nm and 200 nm.

2. A process as claimed in claim 1, wherein nitrates are used as compounds of magnesium, the first element and the second element.

3. A process as claimed in claim 1, wherein the silicium is a sol of silica.

4. A process as claimed in claim 1, wherein the calcination in air is carried out at a temperature between 900° C. and 1200° C. and the calcination in a reducing atmosphere is carried out at a temperature between 1000° C. and 1400° C.

5. A process as claimed in claim 1, wherein the silicate particles have a mean size between 0.1 µm and 0.5 µm.

6. A process as claimed in claim 1, wherein the silicate particles contain crystallites with a crystallite size between 50 nm and 150 nm.

7. A process as claimed in claim 1, wherein the silicate contains at least one additional second element substituting at least one of said first element and of magnesium.

8. A process as claimed in claim 1, wherein said silicate first element is partially substituted with at least one second element chosen from rare earths, and wherein magnesium is partially substituted with at least one second element chosen from zinc, manganese and cobalt.

9. A process as claimed in claim 1, wherein the silicate satisfies the following formula:

$Ba_{3(1-x)}Eu_{3x}Mg_{1-y}Mn_ySi_2O_8$ wherein x and y satisfy the following relationships:

$0<x\leq1.0;\ 0<y\leq0.3$ and $x+y\leq1.2$.

10. A process as claimed in claim 9, wherein x and y satisfy one of the following relationships:

$0.0001<x\leq0.25$ and $0.0001<y\leq0.25$; or $0.01<x\leq0.25$ and $0.01<y\leq0.25$; or $0.01<x\leq0.15$ and $0.04<y\leq0.15$; or $0.099 < x \leq 0.11$ and $0.099 < y \leq 0.11$; or $0.018 < x \leq 0.022$ and $0.045 < y \leq 0.055$.

11. A process as claimed in claim 1, wherein the silicate particles have a distribution index ($\sigma/m$) of at most 1.30.

12. A process as claimed in claim 1, wherein the silicate suspension is such that there is no sedimentation of the particles over a period of 24 hours.

13. A process as claimed in claim 1, wherein the silicate suspension is such that there is no sedimentation of the particles over a period of 24 hours; and if sedimentation is observed after the period of 24 hours, agitation using an ultrasonic treatment with a power of 120 W for three minutes deagglomerates the particles.

14. A process as claimed in claim 11, wherein the silicate particles have a distribution index ($\sigma/m$) of at most 0.75.

* * * * *